United States Patent [19]

Tsuchiya

[11] Patent Number: 5,802,038
[45] Date of Patent: Sep. 1, 1998

[54] RECORDING MEDIUM DETECTING DEVICE AND RECORDING MEDIUM DRIVING APPARATUS USING THE SAME

[75] Inventor: Tatsuhiko Tsuchiya, Iwaki, Japan

[73] Assignee: Alpine Electronics, Inc., Tokyo, Japan

[21] Appl. No.: 649,908

[22] Filed: May 16, 1996

[30] Foreign Application Priority Data

Jun. 9, 1995 [JP] Japan ................................ 7-143708

[51] Int. Cl.$^6$ ............................................. G11B 17/04
[52] U.S. Cl. .................................................. 369/258
[58] Field of Search ................................ 369/258, 261; 360/99.05, 99.06, 96.5, 92

[56] References Cited

U.S. PATENT DOCUMENTS 5,224,079  6/1993  Inoue ............................................. 369/13

FOREIGN PATENT DOCUMENTS

| 4422997-A1 | 1/1995 | Germany | 369/258 |
|---|---|---|---|
| 63-14366 | 1/1988 | Japan | 369/258 |
| 63-149864 | 6/1988 | Japan | 369/258 |
| 4-328359 | 11/1992 | Japan | 369/258 |

Primary Examiner—Stuart S. Levy
Assistant Examiner—Kevin M. Watkins
Attorney, Agent, or Firm—Guy W. Shoup

[57] ABSTRACT

A recording medium drive apparatus including a detecting device for detecting the presence of recording media in a housing section of the apparatus. The detecting device including a pivoting member having a detecting end which is biased to slide along a side face of a recording medium as the recording medium is transferred to/from the housing section. An auxiliary member is provided to prevent the detecting end from entering a groove formed in the side face of the recording medium, thereby preventing incorrect detection that the recording medium is removed from the housing section. The auxiliary member includes a spring leaf which slides along the side face above or below the groove, and a supporting projection, mounted on the detecting end, is supported by an inner face of the leaf spring, thereby preventing the detecting end from moving more than a short distance into the groove. Thus, a position of the detecting member does not change as over the entire length of the side face of the recording medium, so that a constant detection output can be maintained. Consequently, it is possible to reliably detect the ends of the recording medium as it is transferred into and out of the housing section.

14 Claims, 7 Drawing Sheets

RECORDING MEDIUM DETECTING DEVICE AND RECORDING MEDIUM DRIVING APPARATUS USING THE SAME

BACKGROUND OF THE INVENTION

1. Field of the Invention

The present invention relates to a recording medium detecting device and a recording medium driving apparatus using the detecting device. The device is capable of detecting, for example, any recording media in the apparatus. Examples of recording media include an optical recording medium such as a minidisk, a magnetic recording medium, and a storage-type recording medium such as ROM.

2. Description of the Related Art

FIG. 7 is a side view schematically illustrating the construction of a conventional recording medium driving apparatus in which a recording medium, being a minidisk housed in a cassette, is selected for loading onto a loading section.

A recording medium 1 is inserted from the left side of the figure in the X1 direction into a recording medium housing section 2 which is divided into a plurality of housing (storage) areas. At the right side of the figure, there is a loading unit 5 including a loading section 3 and a holding member 4, which moves up and down in the Y1 and Y2 directions in order to stop at a location where it can select any recording media housed in the housing areas. Between the housing section 2 and the holding member 4 are disposed a transfer roller 6 which is rotatingly driven in the forward and reverse directions, and a supporting roller 7 which opposes the transfer roller 6.

FIG. 7 illustrates a recording medium 1 in the uppermost housing area being selected. The recording medium 1 in the uppermost housing area is slightly pushed out in the X1 direction by sending means (not shown) and moves between the transfer roller 6 and the supporting roller 7. Thereafter, the medium 1 is transferred in the X1 direction by the rotational force of the transfer roller 6 and is received in the holding member 4. Then, the holding member 4 moves downward in the Y1 direction to load the recording medium 1 onto the loading section 3. More specifically, the central portion of the minidisk housed in a cartridge is mounted onto a turn table 8 on the loading section 3. The minidisk is rotatingly driven on the turntable 8 in order to read a recording signal by an optical head (not shown).

Upon completion of the reading of the recording medium 1, the holding member 4 holding the recording medium 1 moves upward in the Y1 direction, thus moving away from the loading section 3. Then, the recording medium 1 in the holding member 4 is moved slightly in the X2 direction until the medium 1 is located between the transfer roller 6 and the supporting roller 7, after which by the rotational force of the transfer roller 6 the recording medium 1 is transferred back to an empty housing area of the recording media housing section 2.

In the recording medium driving apparatus of FIG. 7, it is necessary to detect the presence of recording media 1 in the plurality of housing areas of the media housing section 2. By detecting the presence of recording media 1 in the media housing section 2, it is possible to determine whether a recording medium 1 has been transferred out from the medium housing section 2 to the loading section 3, or whether a recording medium, upon completion of reproduction at the loading section 3, has been returned to the medium housing section 2.

However, as illustrated in FIG. 8, the side face Ca of the recording medium 1, being a minidisk housed in a cartridge C, has a complicated form, making detection thereof very difficult. The cartridge C includes a shutter S slidably mounted in the X2 direction to expose a portion of the minidisk through a window formed in an upper surface of the cartridge C. A portion of the shutter S extends over the side face Ca and is slidably engaged with a groove C3 formed in the side portion Ca.

When the recording medium 1 is moved in the directions X1 and X2, the detecting member slides along line La relative to the cartridge C. The line is located about halfway between the upper and lower surfaces of cartridge C, and extends along side portion Ca. A land C4, located along the line La between a recess C1 and the groove C3, is the most suitable portion of the cartridge C for detection. Since, however, the groove C3 is formed along the line La for allowing movement of the shutter S in the X2 direction, the use of a detecting member of the type which slides relative to the cartridge C along line La gives rise to a problem in that the detecting member enters the groove C3 while the recording medium 1 is being moved.

During the detection operation, when the land C4 is used as a detection portion for detecting any recording media 1 in the medium housing section 2, the problem of the detecting member entering the groove C3 while the recording medium 1 is being moved in the direction X1 does not occur. However, when the detecting member enters the groove C3 while the recording medium 1 is being transferred in the X2 direction from the holding member 4 to the transfer roller 6 and back into a housing area of the medium housing section 2, an edge C5 of the shutter S of the recording medium 1 interferes with the detecting member. Since the groove C3 is relatively deep, the edge C5 prevents the detecting member from moving onto a surface Sa of the shutter S, causing the recording medium 1 to be in a locked state and thus preventing it from moving back in the X2 direction.

In the apparatus of FIG. 7, in making detections of the X2 side trailing end of a recording medium being transferred in the X1 direction from the housing section 2 by using a detecting member that slides relative to line La, the detecting member must not move greatly along the entire width W in the direction the recording medium 1 is transferred. Just as in the recording medium driving apparatus having a media housing section 2, illustrated in FIG. 7, in other recording medium driving apparatuses with different constructions, detection of the X2 side trailing end of any medium 1 must be performed to find out whether the medium 1 has been transferred toward the loading section 3.

The detecting member of the type which slides relative to the line La falls into the groove C3 as it slides along the side face Ca of the recording medium, resulting in a change of position of the detecting member and thus a change in the detection output. This causes the detecting member to mistake the edge C5 of the shutter S for the X2 side edge of the recording medium 1.

The side face Ca of the cartridge C shown in FIG. 8 is relatively smooth within the entire width W in the directions of movement of the upper edge C6. Using this portion as detection portion by the detecting member can eliminate the problem of a detecting member falling into the groove. However, since the upper edge C6 is located very close to a guide surface for guiding the upper face of the recording medium, it is very difficult to place the detecting member such that it contacts the upper edge C6. Further, when an ejecting arm is provided for ejecting the recording medium in the X2 direction and the ejecting arm is positioned at the topmost portion of the area of movement of the recording medium, the detecting member has to be placed along the line La because the detecting member cannot be positioned in the same place as the ejecting arm.

SUMMARY OF THE INVENTION

Accordingly, an object of the present invention is to provide a recording medium detecting apparatus in which the detecting member is of the type which detects the presence of any recording medium by sliding relative to a very uneven side face of the recording medium, and the detecting member is prevented from falling in a recess or groove, so that the moving recording medium does not become locked with the detecting member.

Another object of the present invention is to make it possible to reliably detect the trailing end of any recording medium, which is achieved by preventing the detecting member from changing its position greatly as it slides relative to the side face of the moving recording medium.

In accordance with the present invention, a recording medium detecting device includes a detecting member biased to contact with the side face of a recording medium, and a detecting element for detecting a change in the position of the detecting member when the member is in contact with the side face of the recording medium and when the detecting member falls out of contact with the side face. The detecting member is disposed to slide relative to the side face of the recording medium which is partly grooved (that is, the side face includes recesses or holes). An auxiliary member is provided to support the detecting member so that the member does not fall completely into the groove, the auxiliary member being in relative sliding contact with a portion of the side face other than the grooved portion when the grooved portion of the recording medium opposes the detecting member.

When the recording medium moves to a predetermined position, the above-described auxiliary member is resiliently fitted into a recess section in the side face of the recording medium in order to hold the recording medium. Also, when the auxiliary member is fitted into the recess, the detecting member contacts a portion of the side face of the recording medium other than the groove and the recess.

In the recording medium driving apparatus in which the recording medium is transferred between the housing section and the loading section, a still further object of the present invention is to reliably detect the presence of any recording medium in the recording medium housing section, and to achieve smooth movement of the recording medium from the loading section back to the housing section, without the recording medium being blocked by the detecting member.

Though the above-described detecting member may be one which is disposed so as to move, for example, substantially vertically relative to the side face of the recording medium and biased against the side face of the recording medium, it is preferably an arm-shaped member whose detecting end is rotatingly biased in the direction the member contacts the side face of the recording medium. In addition, the auxiliary member may be a leaf spring, which has a projection that presses against the side face of the recording medium. The auxiliary member, when composed of a leaf spring or the like, can be arranged such that the inner side of the projection of the auxiliary member can retain the supporting projection of the detecting end. Further, the detecting element is a switch which is pushed by the moving detecting member in order to change the detection output, or an optical detecting element or a magnetic detecting element that is capable of detecting the movement of the detecting member.

The recording medium is, for example, a disk housed in a cartridge. In such a case the aforementioned groove is provided for allowing shutter movement in order to expose the disk in the cartridge.

In one embodiment, the recording medium driving apparatus of the present invention includes a recording medium housing section for housing recording media, a loading section where recording and reproduction of data of a recording medium are performed, and transferring means for transferring the recording medium between the housing section and the loading section, with the detecting device disposed at a location such that it can detect the recording medium in the housing section.

The recording medium driving apparatus of the present invention includes a recording medium housing section for housing recording media, an ejecting member for ejecting a recording medium housed in the housing section, and a detecting device for detecting the recording medium in the housing section. The detecting device includes a detecting member biased to contact a side face of the recording medium, and a detecting element for detecting a change in position of the detecting member when the member is in contact with the side face of the recording medium and when the member is out of contact with the side face. The detecting member is disposed adjacent to the ejecting member and slides relative to the side face, which is partly grooved, of the recording medium, with an auxiliary member being provided to support the detecting member so that the member does not completely enter into the groove. The auxiliary member is positioned such that it is in relative sliding contact with a portion of the side face located above or below the grooved portion when the grooved portion of the recording medium opposes the detecting member.

The detecting device may be disposed along either side of the path of movement of the recording medium. It may also be disposed where it can detect any recording medium that has been loaded onto the loading section.

The recording medium which is detected by the detecting device of the present invention may be an optical disk or a magnetic disk housed in a cartridge, a magnetic tape housed in a cassette case or a cassette pack, or a plurality of disks housed in a magazine. More specifically, the detecting device is capable of detecting any recording media that is transferred to and loaded onto a loading section and has grooves (including recesses and holes) in its side face which are detected thereby.

The detecting member is, for example, a rotating arm member, whose detecting end is disposed where the recording medium passes or where it can detect a recording medium that has stopped in, for example, the housing section. Since the detecting member is biased toward the side face of the recording medium, as the detecting member slides relative to the side face of the recording medium, the detecting member is biased into the groove, unless an auxiliary member is provided to prevent the detecting member from entering the groove. In accordance with the present invention, when the detecting member opposes the groove, the auxiliary member contacts a portion of the side face having no grooves, recesses, or holes so that the auxiliary member maintains a fixed position relative to the recording medium. The detecting member is supported by the auxiliary member so that it does not fall into the groove.

Therefore, the movement of the recording is not blocked because the detecting member does not get caught in the groove of the moving recording medium. In addition, the detecting member does not change its position greatly during the time it opposes the side face of the recording medium, thus making it possible for the detecting member to make detections over the entire length in the direction of movement of the recording medium, so that, for example, the trailing end of the recording medium can be reliably detected.

The auxiliary member is one that can be resiliently fitted into a recess formed in the side face of the recording medium in order to hold the recording medium. For example, when the recording medium is one that momentarily stops in the housing section, the aforementioned auxiliary member is fitted into the recess of the recording medium in order to firmly hold the recording medium. When the detecting member is in contact with a portion of the side face of the recording medium other than the recessed or grooved portions at the time the auxiliary member is fitted into the recess, it is possible to reliably detect the presence of the stopped recording medium by the detecting member.

Accordingly, in the apparatus in which the recording medium is transferred between the housing section and the loading section, positioning the aforementioned detecting device on a side of the housing section makes it possible to temporarily hold the recording medium in the housing section by the auxiliary member, and to reliably detect the presence of any recording medium in the housing section.

DESCRIPTION OF A PREFERRED EMBODIMENT

A description will hereunder be given of the present invention, with reference to the drawings.

Figure 1:
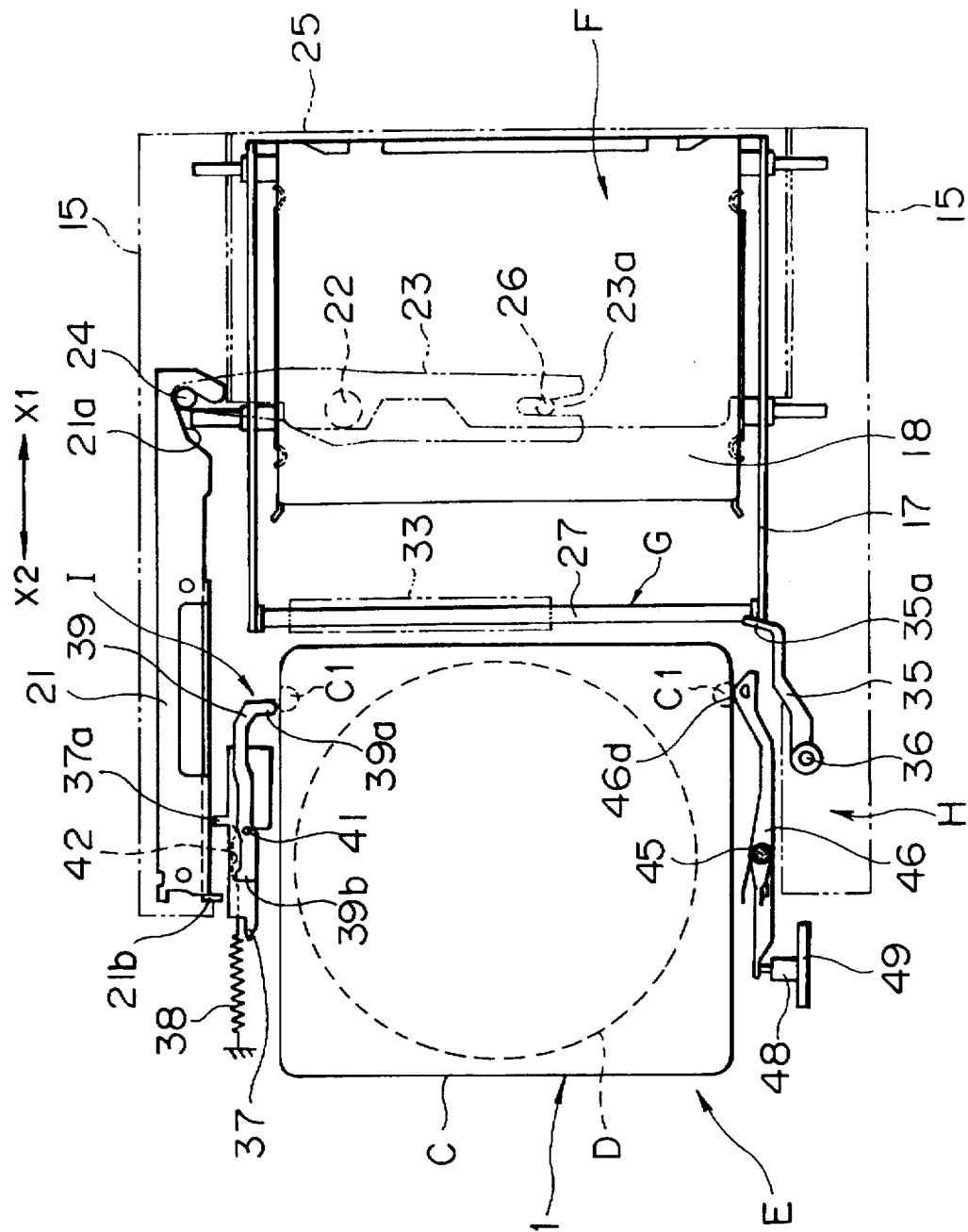
FIG. 1 is a plan view of a recording medium driving apparatus including a detecting device in accordance with an embodiment of the present invention.
Figure 2:
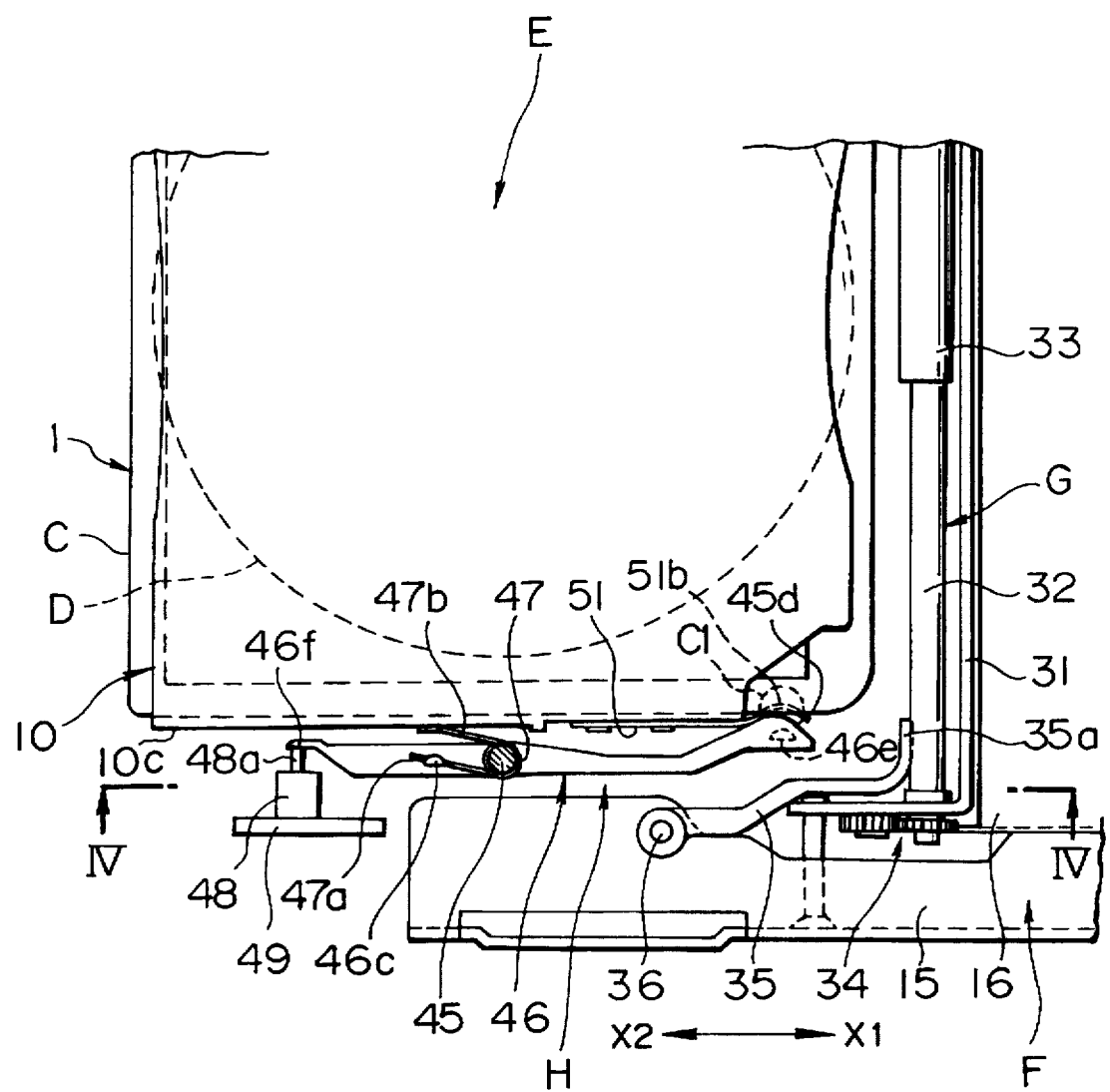
FIG. 2 is a plan view illustrating a recording medium being detected by the detecting device.
Figure 3:
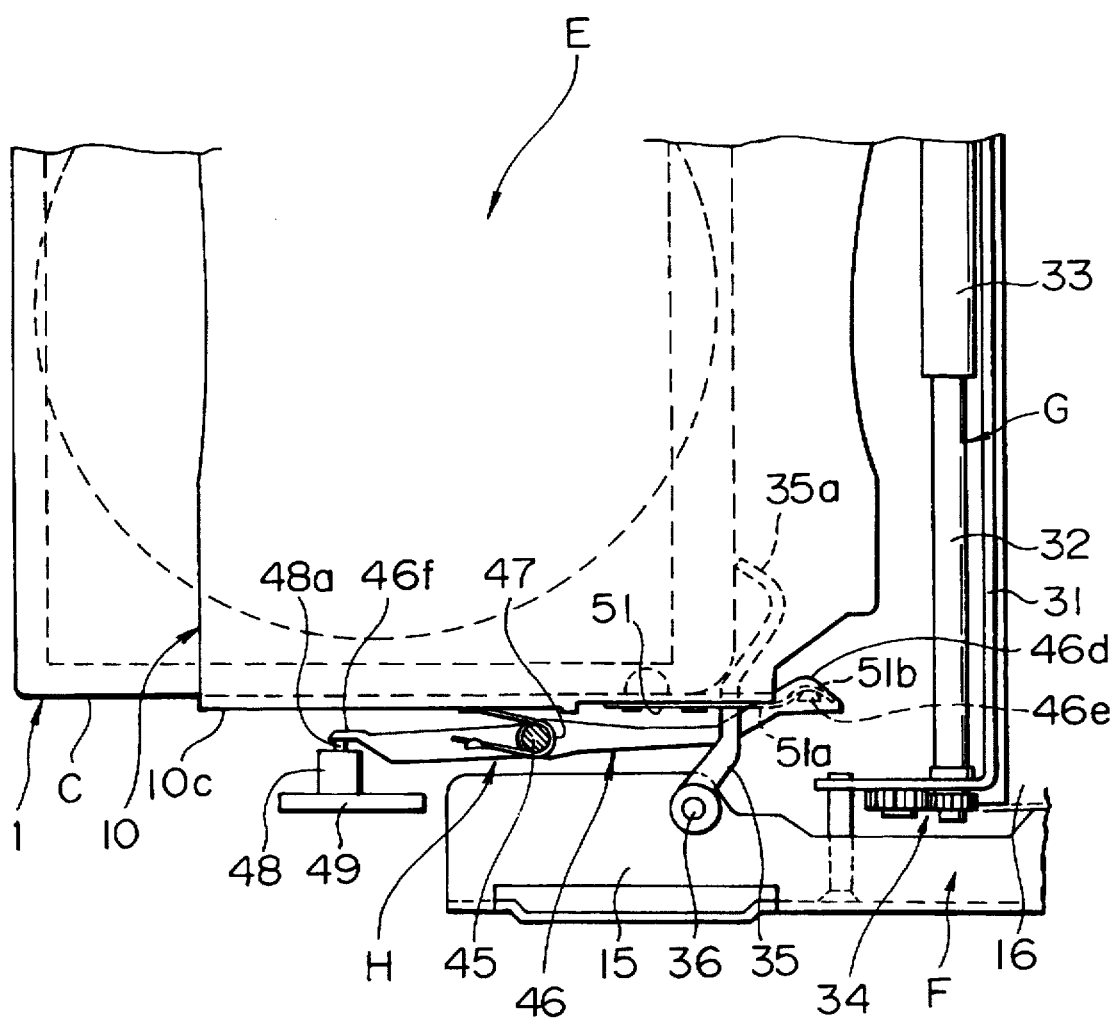
FIG. 3 is a plan view illustrating the recording medium being separated from the detecting device.
Figure 4:
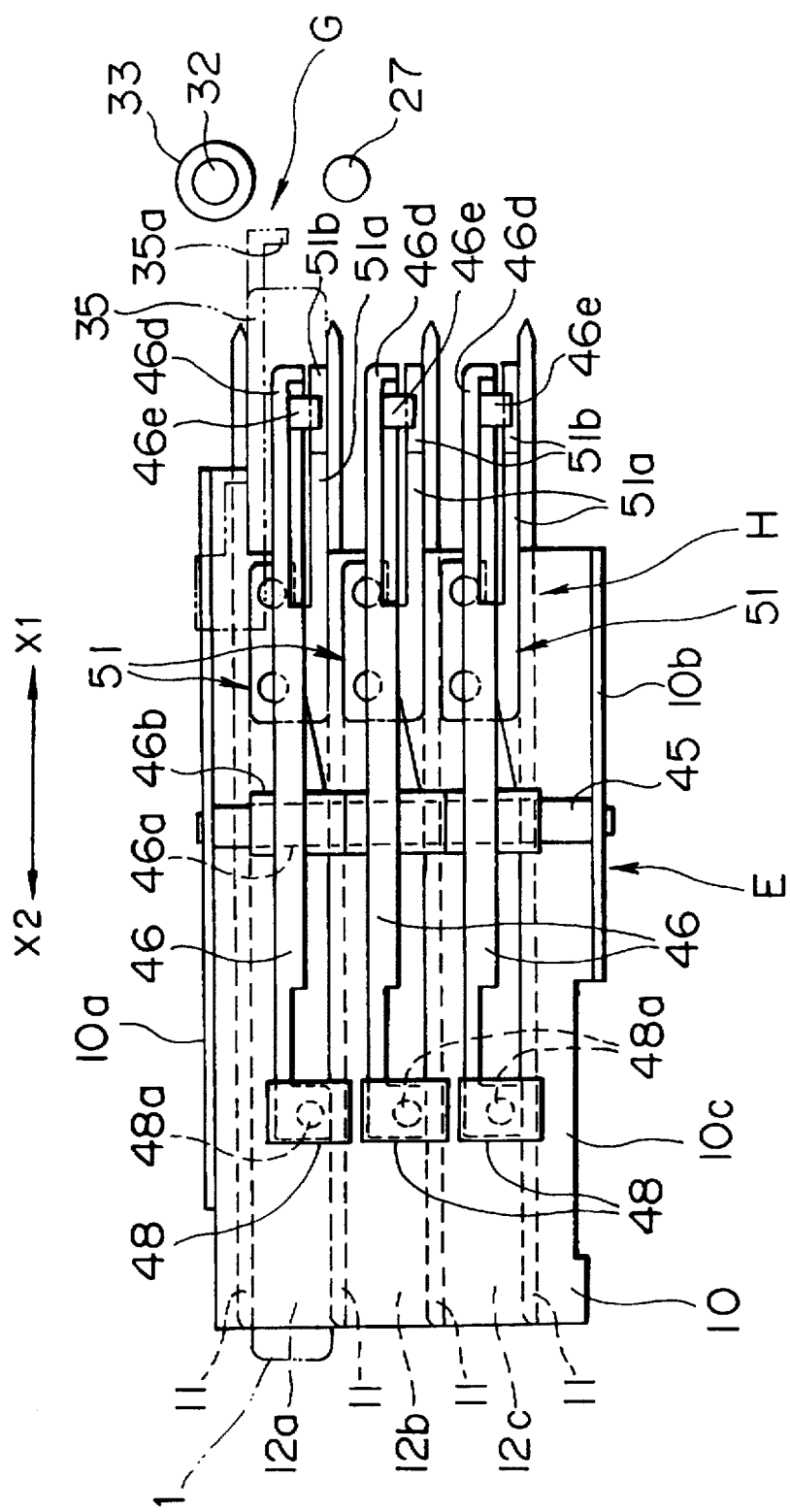
FIG. 4 is side view of the detecting device taken in the direction of the arrows along the line IV—IV of FIG. 2.
Figure 5:
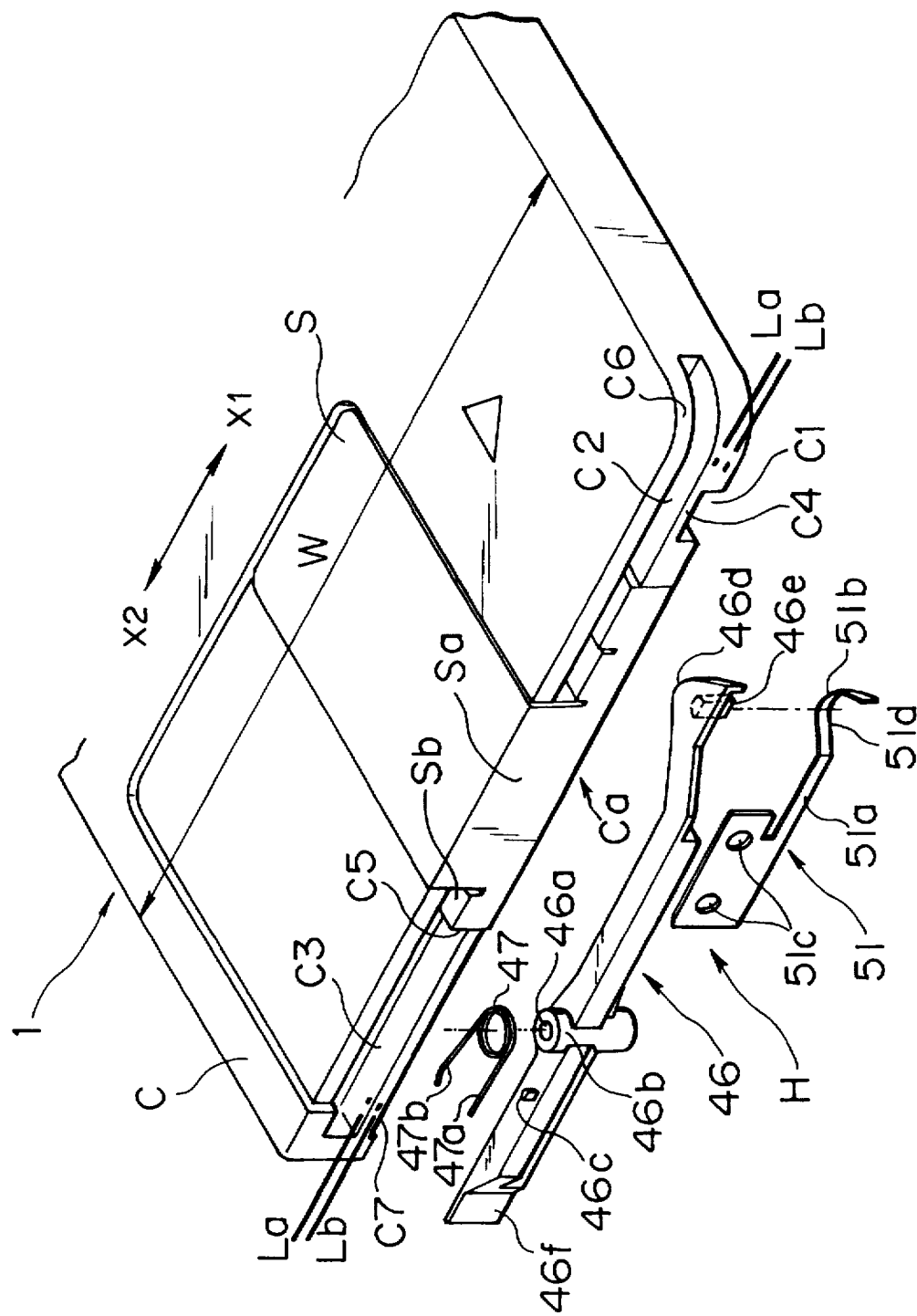
FIG. 5 is an exploded perspective view illustrating the side face of the recording medium and the detecting device in an opposed state.
Figure 6:
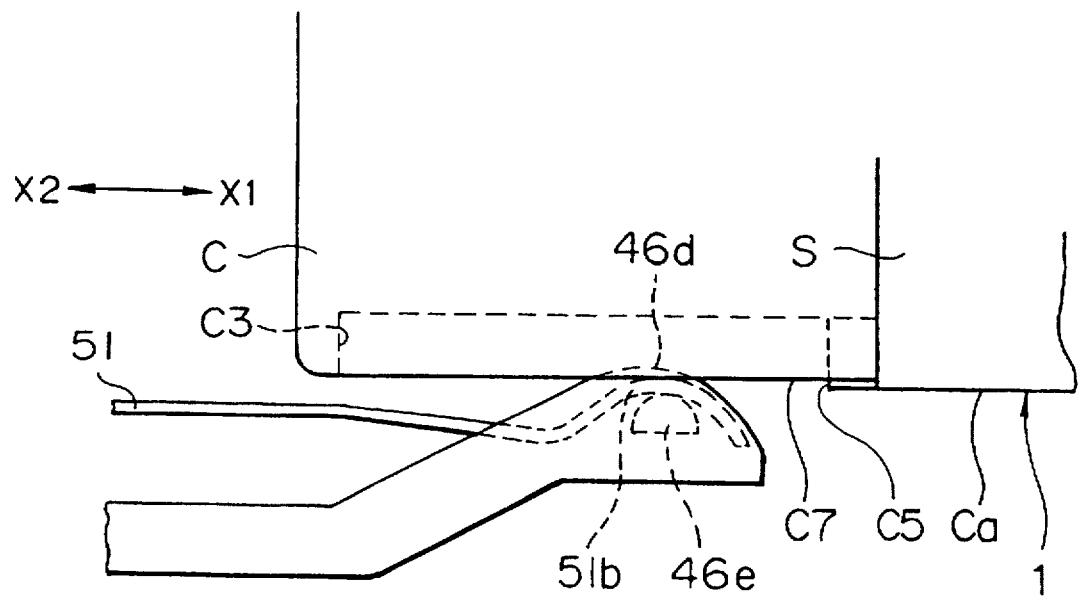
FIG. 6 is a partial plan view illustrating the recording medium sliding past the detecting device.
Figure 7:
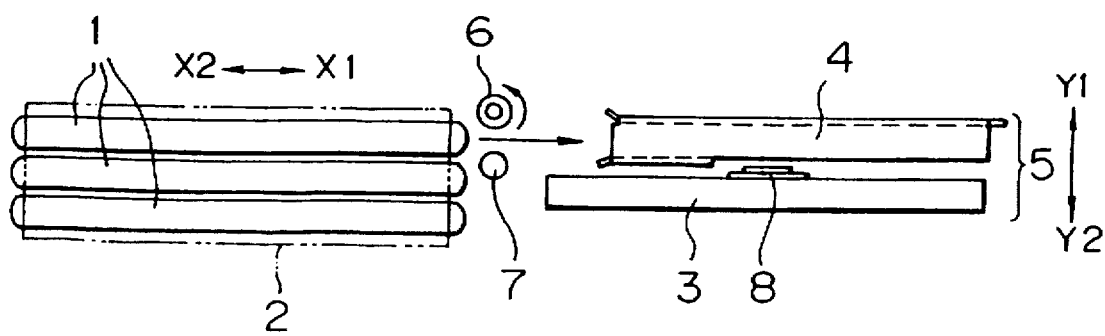
FIG. 7 is a side view of a conventional recording medium driving apparatus.
Figure 8:
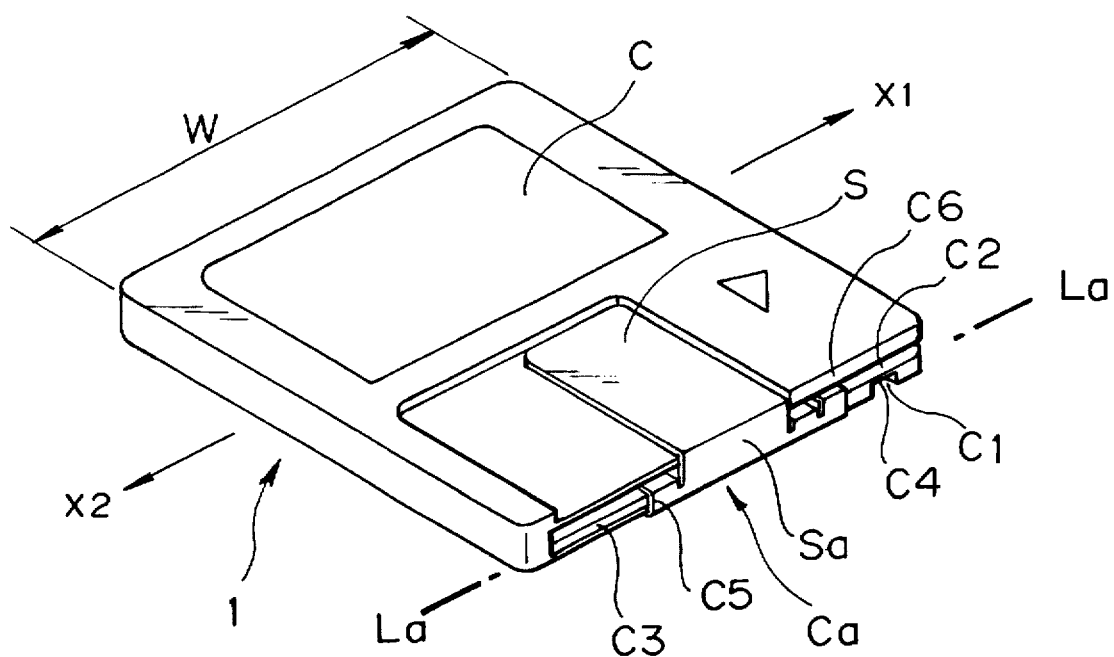
FIG. 8 is a perspective view illustrating a minidisk housed in a cartridge as an example of a recording medium.

FIG. 1 is a plan view of a recording medium driving apparatus for mounting in a vehicle according to a first embodiment of the present invention, in which recording media, each of which is a minidisk housed in a cartridge, are stored in a recording medium housing section, and are transferred between the housing section and the loading section. FIGS. 2 and 3 each illustrate a detecting device and are partially enlarged plan views of FIG. 1. FIG. 4 is a side view taken in the direction of arrows IV—IV of FIG. 2. FIG. 5 is an exploded perspective view illustrating the positional relationship between the side face of the recording medium and the detecting device. FIG. 6 is an enlarged plan view illustrating the recording medium sliding past the detecting member.

The recording medium driving apparatus of FIG. 1 includes a housing section E for housing a plurality of recording media 1, a loading section F for loading the recording medium 1 in order to perform recording and reproducing operations, and transferring means G for transferring the recording medium 1 between the housing section E and the loading section F. Several detecting devices H are disposed on the side of the housing section E, each detecting device H positioned to detect whether one recording medium 1 is housed in its respective housing (storage) area of the housing section E.

As illustrated in FIG. 4, the housing section E includes a case 10. The case 10 is divided into upper, middle and lower sections by four separating walls 11, resulting in the formation of three housing (storage) areas 12a, 12b, and 12c. Recording media 1 are inserted in housing areas 12a, 12b, and 12c in the X1 direction from the left side (see FIG. 4) with a side face Ca of the cartridge C (see FIG. 5) facing a detecting device H.

As shown in FIGS. 1 and 2, the loading section F includes a pair of side bases 15 which extend along the sides of the housing section E and the loading section F. An upper base section 16 is secured between the two side bases 15, 15. As shown in FIG. 1, a loading base 17 is supported below in the upper base section 16, which is movably supported in a resilient manner with respect to the two side bases 15, 15 by means of an elastic supporting member such as a damper. In addition, as shown in FIG. 1, a holder 18 is provided above the loading base 17.

The side base 15 (shown at the upper part of FIG. 1) includes a driving lever (driving member) 21 provided such that it can move in the X1–X2 directions. The driving lever 21 is reciprocatingly driven in the X1 and X2 directions by a driving motor (not shown) mounted on the side base 15. A cam 21a is integrally formed near the X1 side end section of the driving lever 21. Above the aforementioned upper base 16 is disposed a driving arm 23 which rotates around a supporting shaft 22. A shaft 24 retained by the aforementioned cam 21a is secured to one end of the driving arm 23. A driving plate 25 is provided below the upper base 16 such that it can move in the X1–X2 directions. A driving shaft 26 of the driving plate 25 is fitted in a driving slot 23a formed at the other end of the driving arm 23.

When the driving lever 21 is driven in the X1 direction, the cam 21a rotatingly drives the driving arm 23 clockwise, causing the driving plate 25 to move in the X2 direction. This causes the driving plate 25 to move the holder 18 in the X2 direction.

A supporting roller 27 is rotatably supported between the housing section E and the loading base 17. As shown in FIG. 2, a roller supporting plate 31 bridges the left and right side bases 15 with the supporting plate 31 supporting a roller shaft 32 which has a transfer roller 33 secured thereto. As shown in FIG. 4, the aforementioned supporting roller 27 and the transfer roller 33 oppose each other in a vertical direction. The recording medium 1 transferred from any one of the housing areas of the housing section E is pinched between the transfer roller 33 and the supporting roller 27 in order to be transferred in the X1 direction and in the X2 direction. As illustrated in FIG. 2, roller drive gears 34 secured to the roller shaft 32 are provided at an end of the roller supporting plate 31. A feed motor (not shown)

mounted on the side base 15 drives the roller drive gear 34, thus rotatingly driving the aforementioned roller shaft 32 and the transfer roller 33. In the present embodiment, transfer means G is composed of the supporting roller 27 and the transfer roller 33.

As illustrated in FIGS. 1 and 2, an ejecting member 35 is provided on the side base 15 (shown at the lower part of these figures) of the loading section F. The ejecting member 35 is rotatably supported by a supporting shaft 36. When a driving mechanism (not shown) rotates the ejecting member 35 counterclockwise, the selected recording medium 1 is ejected in the X2 direction through an arm end section 35a of the ejecting member 35, as shown in FIG. 3.

The loading section F with the above-described construction moves vertically with reference to FIG. 4 due to the driving force of the selection drive mechanism. The movement of the loading section F causes it to oppose the recording medium 1 to be selected from any of the housing areas 12a, 12b, and 12c, each of which together form three levels in the housing section E. FIG. 4 illustrates the loading section F opposing the recording medium 1 in the topmost housing area 12a of the housing section E. When the loading section F stops at the position of the topmost housing area 12a for selection, the transfer roller 33 and the supporting roller 27 oppose the topmost recording medium 1. The ejecting member 35, also, stops at a position where it can eject the topmost recording medium 1. As can be understood from FIG. 4, the ejecting member 35 is disposed so as to oppose the upper edge of the selected recording medium 1.

As shown in FIG. 1, feeding mechanism I is provided at the same side of the housing section E as the driving lever 21. The feeding mechanism includes three sliding members 37, each sliding member being associated with one of the housing areas 12a, 12b, and 12c, which are provided on the side of the case 10 of the housing section E. Each of the sliding members 37 is slidably supported to move in the X1–X2 directions and are biased in the X2 direction by a return spring 38. A feed lever 39 is rotatably connected to each of the sliding members 37 via a shaft 41 and is biased by a biasing spring (not shown) such that the feed lever 39 can rotate clockwise along the sliding members 37 (as viewed in FIG. 1). A feed portion 39a is formed at an end of the feed lever 39, and a sliding end 39b is formed at the base thereof, the sliding end 39b being pressed against an uneven guide surface 42 by the biasing force of the aforementioned biasing spring.

When the loading section F moves vertically (in FIG. 4) and stops at a position for selecting one of the recording media 1, a pressing portion 21b of the driving lever 21 opposes a tab 37a of the sliding member 37, which is positioned at the side of the selected recording medium 1. With the pressing portion 21b opposing the tab 37a, when the driving lever 21 is driven in the X1 direction, the tab 37a is moved by the pressing portion 21b in the X1 direction, causing the sliding member 37 to move in the X1 direction. When this takes place, the sliding end 39b of the feed lever 39 slides relative to the uneven guide surface 42, so that the feed lever 39, while moving in the X1 direction, momentarily rotates clockwise, after which it starts rotating counterclockwise. When the feed lever 39 rotates clockwise, the feed portion 39a engages a recess C1 in the selected recording medium 1 in order to send out the recording medium 1 in the X1 direction by the movement of the feed lever 39.

When the driving lever 21 moves in the X1 direction, the driving arm 23 rotates clockwise, causing the holder 18 along with the driving plate 25 to move in the X2 direction.

The recording medium 1 sent out in the X1 direction by the feed lever 39 is pinched between the transfer roller 33 and the supporting roller 27, and is sent in the X1 direction by the rotational power of the transfer roller 33 in order to be held by the holder 18.

Thereafter, the driving lever 21 moves in the X2 direction and back to its original position, causing the sliding member 37 and the feed lever 39 to move in the X2 direction and back to its original position by the return spring 38. The counterclockwise rotation of the driving arm 23 causes the driving plate 25 and the holder 18 to move in the X1 direction and back to its original position. Then, the recording medium 1 held by the holder 18 is loaded onto the loading base 17 where recording and reproducing operations can be performed.

Upon completing reproduction of the data on the recording medium loaded on the loading base 17, the driving lever 21 is driven again in the X1 direction, during which, as described above, the holder 18 moves in the X2 direction in order to pinch the recording medium 1 held by the holder 18 between the transfer roller 33 and the supporting roller 27 and return it back to the housing area of the housing section E. Upon separation of the recording medium 1 from the transferring roller 33 as the recording medium 1 enters the housing section E, the driving lever 21 moves in the X2 direction to return to its original position. The recording medium 1 is moved back to the position illustrated in FIG. 1 (that is, completely housed in the housing area of the housing section E) by the feed portion 39a of the feed lever 39 which moves in the same direction to return to its original position.

A distinctive feature of the present invention is the detecting device H which is disposed on a side of the housing section E opposite the driving lever 21. The detecting device H detects the presence of the recording media 1 in the housing areas 12a, 12b, and 12c of the housing section E.

As illustrated in FIG. 4, in the housing section E, three detecting members 46 are provided outside of a side plate 10c of the case 10. More specifically, each detecting member 46 is placed along side one of the housing areas 12a, 12b, and 12c. As illustrated in FIG. 5, each detecting member 46 has the shape of an arm and has a supporting hole 46a formed in a boss 46b formed substantially at the central portion of each detecting member 46. Referring to FIG. 4, supporting plates 10a and 10b are secured to the upper and lower faces of the case 10, with a supporting shaft 45 secured between the supporting plates 10a and 10b. The supporting shaft 45 is inserted into the supporting holes 46a of the detecting members 46 to rotatably support each of the detecting members 46. As illustrated in FIGS. 2 and 5, a torsion detecting spring 47 is provided at the outer periphery of the boss 46b of each detecting member 46. One arm 47a of the detecting spring 47 is retained by a protrusion 46c formed at the upper face of each detecting member 46, and the other arm 47b is retained by the side plate 10c of the case 10. Each detecting member 46 is biased counterclockwise on the supporting shaft 46, as viewed in FIG. 1.

As shown in FIG. 5, one end of each detecting member 46 includes a detecting end 46d extending toward the housing areas 12a, 12b, and 12c, with a support projection 46e formed integrally with the lower face of the detecting end 46d. The other end of the detecting member 46 includes a switch pressing portion 46f. Three switches 48 (shown in FIGS. 1–3) serve as detecting elements and are provided outside of the side plate 10c of the case 10, with the switches 48 being fixed to a common supporting plate 49. As illustrated in FIG. 3, when the detecting member 46 is rotated counterclockwise due to the biasing force of the detecting spring 47, the switch pressing portion 46f pushes a detecting projection 48a of the switch 48. As shown in FIG. 2, when the side face Ca of the recording medium 1 pushes the detecting end 46d, causing the detecting member 46 to rotate clockwise, the switch pressing portion 46f separates from the detecting projection 48a, thereby switching the detection output of the switch 48.

Three auxiliary members 51 are provided on the outer side of the side plate 10c of the case 10 of the housing section E in correspondence with the housing areas 12a, 12b, and 12c. Each auxiliary member 51 is composed of leaf spring, with mounting holes 51c formed in the base thereof secured to the outer face of the side plate 10c. An elastic arm 51a extending in the X1 direction is integrally formed with the base, and an end of the elastic arm 51a is formed into a curved projection 51b such that it curves toward the housing areas 12a, 12b, and 12c. As shown in FIG. 3, when the elastic arm 51a extends parallel to the side plate 10c along the X1–X2 direction, the projection 51b is resiliently biased into the housing areas 12a, 12b, 12c. The supporting projection 46e formed on the lower face of the detecting end 46d of the detecting member 46 is aligned to contact an inner face 51d of the projection 51b when the detection end 46d moves toward the case 10.

As illustrated in FIG. 5, the recording medium 1 in the present embodiment is a magneto-optic recording minidisk D housed in the cartridge C. When the recording medium 1 is inserted into the case 10, the side face Ca faces the detecting device H. The side face Ca includes a circular arc-shaped, slot-like recess C1 formed in the lower surface of the cartridge C adjacent one end, and a groove C2 extending along the side face Ca a little above a center thereof. A shutter S is provided on the cartridge C and includes a side portion 5a extending over the side face Ca. The side face Ca includes a groove C3 which receives a guide portion Sb extending from the side portion Sa of the shutter S such that the shutter S can slide in the X2 direction. The width of the groove C3 in the vertical direction is larger than that of the groove C2.

When a cartridge C moves in the directions X1 and X2 within the housing areas 12a, 12b and 12c, the detecting end 46d of the detecting member 46 moves relative to the cartridge C along line La extending along the side face Ca. The side face Ca includes a land C4 having no grooves or recesses which is located along the line La between the recess C1 and the groove C2. Accordingly, there are no recesses in side face Ca along the line La near the X1 side of the cartridge C. Therefore, as the detecting end 46d slides along this portion of the side face Ca, the problem of the detecting end 46d falling into a recess does not occur. However, the groove C3 is also located along the line La toward the X2 side into which the detecting end 46d can enter.

Each projection 51b of the auxiliary member 51 slides relative to line Lb running along the side face Ca of a recording medium 1 housed in one of the housing areas 12a, 12b, and 12c. Other than the recess C1, there are no recesses or grooves formed in the side face Ca along the line Lb so that the projection 51b of the auxiliary member 51 predominantly slides along a relatively flat surface C7.

A description will now be given of the detecting operation of the aforementioned detecting device H.

The detecting end 46d of a detecting member 46 is out of contact with the side face Ca of a recording medium 1, when (1) the recording medium is not housed in the housing area 12a, 12b, and 12c opposing the detecting end 46d of the detecting member 46 (that is, when no recording media have been inserted into the housing areas), (2) when the recording medium 1 in the housing area is sent to the loading section F in order perform reproduction of data, or (3) as shown in FIG. 3, the counterclockwise rotation of the ejecting member 35 pushes the recording medium 1 in the X2 direction by a predetermined distance. As illustrated in FIG. 3, the projection 51b of the auxiliary member 51 is stable at the position where it projects within the housing area; that is, the projection 51b is resiliently biased in the direction that it projects. Therefore, when the detecting end 46d is out of contact with the side face Ca of the recording medium 1, the end 46d projects within the housing area along with the projection 51b retained via the supporting projection 46e. With the detecting end 46d projecting within the housing area, the detecting member 46 rotates counterclockwise, which causes the switch pressing portion 46f to push the detecting projection 48a of the switch 48, so that the detection output of the switch 48 is ON. Therefore, side face Ca of the recording medium 1 opposing the detecting end 46d is not detected.

FIG. 2 illustrates the recording medium 1 being housed in place in the housing area after having been inserted in the housing area in the X1 direction from the left side of the figure, or after having been transferred in the X2 direction from the loading section F through the transfer roller 33 and back to the housing area by the feed lever 39. At this time, the projection 51b of the auxiliary member 51 is resiliently fitted into the recess C1 of the side face Ca of the cartridge C, so that the recording medium 1 is held in the housing area in a stable state.

In order to be fitted into the recess C1, the projection 51b of the auxiliary member 51 projects within the housing area, with the detecting end 46d of the detecting member 46 being in contact with the land C4 between the recess C1 and the groove C2. Accordingly, the detecting member 46 rotates clockwise, and, as a result, the switch pressing portion 46f separates from the detecting projection 48a of the switch 48, so that the detection output of the switch 48 is OFF. The OFF detection output indicates that there is a recording medium 1 opposing the detecting end 46d of the detecting member 46.

When the recording medium 1 is moved in the X1 or X2 directions, the detecting end 46d of the detecting member 46 slides relative to side face Ca along the line La and is positioned opposite the groove C3 of the side face Ca. This occurs when the recording medium 1 is being transferred by the transfer roller 33 toward the loading section F from the housing area of the housing section E, or when the recording medium 1 is being transferred toward the housing section E from the loading section F. The detecting end 46d of the detecting member being rotatingly biased counterclockwise tries to move into the groove C3. In this case, however, the projection 51b of the auxiliary member 51 sliding relative to the line Lb slides relative to the flat surface C7 without any grooves. Therefore, as shown in FIG. 6, the elastic arm 51a of the auxiliary member 51 is deformed in a clockwise direction, and the projection 51b is deformed and moves downward in FIG. 6. This causes the supporting projection 46e of the detecting end 46d to come into contact with the inner face 51d of the projection 51b of the auxiliary member 51, thereby causing the detecting end 46d to be supported by the projection 51b and thus preventing the detecting end 46d from moving deeply into the groove C3.

Accordingly, with the arrangement illustrated in FIG. 6, when the recording medium 1 moves in the X2 direction and the edge C5 of the shutter S comes into contact with the detecting end 46d, the detecting end 46d can easily move onto the surface of the side portion Sa of the shutter S. Consequently, the recording medium 1 can be transferred back smoothly to the housing section E from the loading section F by the transfer roller 33, without being caught.

Since the detecting end 46d sliding relative to the line La running along the side face Ca of the cartridge C does not move deeply into the groove over the entire range of the width W thereof, as viewed in the directions in which the recording medium 1 is transferred, the detecting member 46 is maintained in the position shown in FIG. 2, while the side face Ca of the recording medium 1 is passing past the detecting end 46d. In addition, the detecting member 46 rotates counterclockwise as illustrated in FIG. 3, only when the X1 side edge or the X2 side edge of the recording medium 1 reaches the position of the detecting end 46d. Accordingly, when the detecting member 46 rotates up to the angle illustrated in FIG. 3, the detecting projection 48a of the switch 48 is pushed so as to set the output of the switch 48 ON, thus allowing reliable detection of the starting and trailing ends by the detecting member 46.

Accordingly, in the present embodiment, not only is it possible to detect a recording medium inserted in place in the housing area, as illustrated in FIG. 2, by the detecting member 46. It is also possible to reliably detect the presence of the trailing end (or the X2 side end) of the recording medium 1 when it is being transferred toward the X1 side by the transfer roller 33, as well as to reliably determine whether the recording medium has been ejected in the X2 direction by the ejecting member 35, as illustrated in FIG. 3.

In addition, in the present embodiment, as illustrated in FIG. 4, the ejecting member 35 opposes the upper end C6 of the cartridge C of the recording medium 1, so that for a recording medium 1 which is not very thick, the ejecting member 35, the detecting member 46 which slides relative to the line La, and the auxiliary member 51 which slides relative to the line Lb so that it can be held in the recess C1 can all be effectively arranged.

Providing a set of the detecting members 46 of the above-described detecting device H and auxiliary member 51 toward the loading section F makes it possible to reliably detect whether a recording medium 1 is loaded on the section F. In addition, even for an apparatus in which only one recording medium is loaded on the loading section F, the detecting device H can reliably detect a moving recording medium 1, regardless of the unevenness of the side face Ca of the recording medium 1.

As can be understood from the foregoing description, according to the present invention, even when the detecting member is of the type which slides relative to the uneven side face of the recording medium with grooves, the detecting member is supported by an auxiliary member, thus preventing the detecting member from falling deeply into the groove of the recording medium and thus from being caught in the groove while the recording medium is being transferred. This makes it possible to transfer the recording medium smoothly. Accordingly, in an apparatus in which the recording medium is transferred between the housing section and the loading section, when a detecting device is provided at the housing section, the recording medium being transferred from the loading section to the housing section will not get caught by the detecting member, thus allowing smooth transfer of the recording medium.

In addition, even when the detecting member is one which slides relative to the uneven side face of the recording medium, it will not fall into the recess, so that the position of the detecting member remains substantially unchanged over the entire width as viewed in the direction the recording medium is transferred. Therefore, the detecting condition of the detecting device, when the recording medium is moving along the detecting member remains the same, thus preventing incorrect detection of the edge of the recording medium and thus assuring reliable detection.

Further, if the apparatus is one in which the recording medium is held by an auxiliary member so that detection can be performed of the presence of the side face of the recording medium, without the detecting member falling into the recess, it is possible to hold the same portion of the recording media housed in the housing section by the auxiliary member as well as perform detection by the detecting member.

What is claimed is:

1. A recording medium detecting device for detecting the presence of a recording medium in a storage area, the recording medium having upper and lower surfaces and a side face, the side face having a width extending between the upper and lower surfaces and a length extending perpendicular to the width, the side face defining a groove extending along the side face, the detecting device comprising:

a detecting member disposed to slide relative to the length of the side face when the recording medium is moved in the storage area, the detecting member being biased toward the side face such that the detecting member is in a first position when the detecting member is in contact with the recording medium, and in a second position when the recording medium is displaced from the storage area;

a detecting element for detecting the first and second positions of the detecting member; and an auxiliary member disposed to slide relative to the length of the side face, the auxiliary member being biased toward the side face;

wherein, when the detecting member is located opposite the groove in the side face, the auxiliary member contacts a portion of the side face having no groove and the detecting member is positioned over the groove, and the detecting member contacts the auxiliary member such that the detecting member is prevented from entering the groove.

2. A recording medium detecting device according to claim 1, wherein, when the recording medium is in a predetermined position within the housing section, the auxiliary member is resiliently received in a recess formed in the side face of the recording medium such that the recording medium is held by the auxiliary member, and wherein when the auxiliary member is received in the recess, the detecting member contacts a second portion of the side face.

3. A recording medium detecting device according to claim 2, wherein the detecting member comprises an elongated member rotatably mounted adjacent the storage area and includes a detecting end disposed to contact the side face of the recording medium and a supporting projection mounted on the detecting end;

wherein the auxiliary member comprises a leaf spring having a curved projection resiliently biased toward the side face of the recording medium; and wherein, when the detecting member is located opposite the groove in the side face, the curved projection of the auxiliary member is bent away from the recording medium, and the supporting projection of the detecting member contacts an inner surface of the curved projection.

4. A recording medium detecting device according to claim 1,
wherein the detecting member comprises an elongated member rotatably mounted adjacent the storage area and includes a detecting end disposed to contact the side face of the recording medium and a supporting projection mounted on the detecting end;
wherein the auxiliary member comprises a leaf spring having a curved projection resiliently biased toward the side face of the recording medium; and
wherein, when the detecting member is located opposite the groove in the side face, the curved projection of the auxiliary member is bent away from the recording medium, and
the supporting projection of the detecting member contacts an inner surface of the curved projection.

5. A recording medium detecting device according to claim 1, wherein the recording medium comprises:
a cartridge having the upper, lower and side faces, the upper surface defining a window;
a disk housed in the cartridge and having a portion exposed through the window; and
a shutter slidably mounted on the cartridge to cover the window, the shutter having a portion slidably received in the groove formed in the side face of the cartridge.

6. A recording medium driving apparatus for reproducing data stored on a selected recording medium, the recording medium having upper and lower surfaces and a side face, the side face having a width extending between the upper and lower surfaces and a length extending perpendicular to the width, the side face defining a groove extending along the side face, the apparatus comprising:
a housing section for storing a plurality of recording media including the selected recording medium;
a loading section including means for reproducing data stored on the selected recording medium;
transferring means for transferring the selected recording medium between the housing section and the loading section; and
a detecting device for detecting the presence of the selected recording medium in the housing section, the detecting device including:
a detecting member disposed to slide relative to the length of the side face when the recording medium is transferred by the transferring means, the detecting member being biased toward the side face such that the detecting member is in a first position when the detecting member is in contact with the recording medium, and in a second position when the recording medium is displaced from the housing section;
a detecting element for detecting the first and second positions of the detecting member; and
an auxiliary member mounted disposed to slide relative to the length of the side face, the auxiliary member being biased toward the side face;
wherein, when the detecting member is located opposite the groove in the side face, the auxiliary member contacts a portion of the side face having no groove and the detecting member is positioned over the groove, and the detecting member contacts the auxiliary member such that the detecting member is prevented from entering the groove.

7. A recording medium driving apparatus according to claim 6, wherein, when the recording medium is in a predetermined position within the housing section, the auxiliary member is resiliently received in a recess formed in the side face of the recording medium such that the recording medium is held by the auxiliary member, and wherein when the auxiliary member is received in the recess, the detecting member contacts a second portion of the side face.

8. A recording medium driving apparatus according to claim 7,
wherein the detecting member comprises an elongated member rotatably mounted adjacent the housing section and includes a detecting end disposed to contact the groove in the side face of the recording medium and a supporting projection mounted on the detecting end;
wherein the auxiliary member comprises a leaf spring having a curved projection resiliently biased toward the side face of the recording medium; and
wherein, when the detecting member is located opposite the groove in the side face, the curved projection of the auxiliary member is bent away from the recording medium, and
the supporting projection of the detecting member contacts an inner surface of the curved projection.

9. A recording medium driving apparatus according to claim 6,
wherein the detecting member comprises an elongated member rotatably mounted adjacent the housing section and includes a detecting end disposed to contact the groove in the side face of the recording medium and a supporting projection mounted on the detecting end;
wherein the auxiliary member comprises a leaf spring having a curved projection resiliently biased toward the side face of the recording medium; and
wherein, when the detecting member is located opposite the groove in the side face, the curved projection of the auxiliary member is bent away from the recording medium, and
the supporting projection of the detecting member contacts an inner surface of the curved projection.

10. A recording medium driving apparatus according to claim 6, wherein the recording medium comprises:
a cartridge having the upper, lower and side faces, the upper surface defining a window;
a disk housed in the cartridge and having a portion exposed through the window; and
a shutter slidably mounted on the cartridge to cover the window, the shutter having a portion slidably received in the groove formed in the side face of the cartridge.

11. A recording medium driving apparatus for reproducing data stored on a selected recording medium, the recording medium having upper and lower surfaces and a side face, the side face having a width extending between the upper and lower surfaces and a length extending perpendicular to the width, the side face defining a groove extending along the side face, the apparatus comprising:
a housing section for storing a plurality of recording media including the selected recording medium;
an ejecting device for ejecting the selected recording medium from the housing section; and
a detecting device for detecting the presence of the selected recording medium in the housing section, the detecting device including:
a detecting member disposed to slide relative to the length of the side face when the recording medium is ejected by the ejecting device, the detecting member being biased toward the side face such that the detecting member is in a first position when the detecting member is in contact with the recording medium, and in a second position when the recording medium is displaced from the housing section;

a detecting element for detecting the first and second positions of the detecting member; and an auxiliary member mounted disposed to slide relative to the length of the side face, the auxiliary member being biased toward the side face;

wherein, when the detecting member is located opposite the groove in the side face, the auxiliary member contacts a portion of the side face having no groove and the detecting member is positioned over the groove, and the detecting member contacts the auxiliary member such that the detecting member is prevented from entering the groove.

12. A recording medium driving apparatus according to claim 11, wherein, when the recording medium is in a predetermined position within the housing section, the auxiliary member is resiliently received in a recess formed in the side face of the recording medium such that the recording medium is held by the auxiliary member, and wherein when the auxiliary member is received in the recess, the detecting member contacts a second portion of the side face.

13. A recording medium driving apparatus according to claim 12, wherein the detecting member comprises an elongated member rotatably mounted adjacent the housing section and includes a detecting end disposed to contact the groove in the side face of the recording medium and a supporting projection mounted on the detecting end;

wherein the auxiliary member comprises a leaf spring having a curved projection resiliently biased toward the side face of the recording medium; and wherein, when the detecting member is located opposite the groove in the side face, the curved projection of the auxiliary member is bent away from the recording medium, and the supporting projection of the detecting member contacts an inner surface of the curved projection.

14. A recording medium driving apparatus according to claim 11, wherein the detecting member comprises an elongated member rotatably mounted adjacent the housing section and includes a detecting end disposed to contact the groove in the side face of the recording medium and a supporting projection mounted on the detecting end;

wherein the auxiliary member comprises a leaf spring having a curved projection resiliently biased toward the side face of the recording medium; and wherein, when the detecting member is located opposite the groove in the side face, the curved projection of the auxiliary member is bent away from the recording medium, and the supporting projection of the detecting member contacts an inner surface of the curved projection.

* * * * *